(12) United States Patent  
Chivukula

(10) Patent No.: US 9,123,254 B2  
(45) Date of Patent: Sep. 1, 2015

(54) METHOD AND SYSTEM FOR MANAGING SURVEYS

(75) Inventor: Venkata B. Chivukula, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 41 days.

(21) Appl. No.: 13/490,491

(22) Filed: Jun. 7, 2012

(65) Prior Publication Data

US 2013/0330703 A1     Dec. 12, 2013

(51) Int. Cl.
*G09B 7/00* (2006.01)
*G06Q 30/02* (2012.01)

(52) U.S. Cl.
CPC .............. *G09B 7/00* (2013.01); *G06Q 30/0201* (2013.01)

(58) Field of Classification Search
CPC ........... G09B 3/00; G09B 7/00; G06Q 30/021
USPC .................. 434/322; 705/7.29, 7.31, 7.32
See application file for complete search history.

(56) References Cited

U.S. PATENT DOCUMENTS

2010/0250644 A1* 9/2010 Toomey et al. ............... 709/202

* cited by examiner

*Primary Examiner* — Xuan Thai
*Assistant Examiner* — Robert P Bullington
(74) *Attorney, Agent, or Firm* — Jones Robb, PLLC

(57) ABSTRACT

A method, a system, and a computer program product for creating and conducting a survey are disclosed. While creating the survey, one or more answer formats corresponding to each of the one or more questions are defined. Then, answering mediums corresponding to each of the one or more answer formats are defined. The survey is then created based on at least one of the questions, the answer formats, and the answering mediums. The survey is then available to the associated users. While conducting the survey, the system receives answers for the questions in the survey through the answering mediums in their associated answer format, and compiles a survey report.

9 Claims, 4 Drawing Sheets

METHOD AND SYSTEM FOR MANAGING SURVEYS

TECHNICAL FIELD

The presently disclosed embodiments are directed to a management of surveys. More particularly, the presently disclosed embodiments are directed to a method and system for creating and conducting interactive surveys.

BACKGROUND

Inbound product marketing greatly relies on surveys to accurately assess the responses of a customer. With the increasing complexity of questions, and length of these surveys, there is a need to better communicate, and retain the attention of the respondents to ensure quality of responses.

SUMMARY

According to embodiments illustrated herein, there is provided a method for creating a survey. The method includes defining one or more questions. One or more answer formats corresponding to each of the one or more questions are then defined. The one or more answer formats correspond to at least one of a gesture, joystick commands, or video. Thereafter, an answering medium corresponding to each of the one or more answer formats is defined. Answers corresponding to the one or more questions in the defined one or more answer formats are receivable through the associated answering mediums. The survey is then created based on at least one of the one or more questions, the one or more answer formats, and the answering medium corresponding to each of the one or more answer formats.

According to embodiments illustrated herein, there is provided a method for conducting a survey. The method includes presenting a survey on a computational unit. The survey includes one or more questions. Then, one or more answer formats associated with each of the one or more questions are determined. The one or more answer formats correspond to at least one of a gesture, joystick commands, or video. Answers corresponding to the one or more questions are received through one or more answering mediums associated with the one or more answer formats. The one or more answering mediums include at least one of a joystick, a microphone, a camera, or an accelerometer equipped device associated with the computational unit. Thereafter, a survey report is compiled based on the answers.

According to embodiments illustrated herein, there is provided a system for creating a survey. The system includes an answer management module and a survey compilation module. The answer management module is configured for defining one or more answer formats corresponding to each of one or more questions. The one or more answer formats correspond to at least one of a gesture, joystick commands, or video. The answer management module is also configured for defining an answering medium corresponding to each of the one or more answer formats. The answering medium includes at least one of a joystick, a microphone, a camera, or an accelerometer equipped device. Answers corresponding to the one or more questions in the defined one or more answer formats are receivable through the associated answering mediums. The survey compilation module is configured for creating the survey based on at least one of the one or more questions, the one or more answer formats, and the answering medium corresponding to each of the one or more answer formats.

According to embodiments illustrated herein, there is provided a system for conducting a survey. The system includes a presentation module and an answer receiving module. The presentation module is configured for enabling presentation of a survey on a computational unit. The survey includes one or more questions. The answer receiving module is configured for determining one or more answer formats associated with each of the one or more questions. The one or more answer formats correspond to at least one of a gesture, joystick commands, audio, or video. The answer receiving module is further configured for receiving answers corresponding to the one or more questions through one or more answering mediums associated with the one or more answer formats. The one or more answering mediums include at least one of a joystick, a microphone, a camera, or an accelerometer equipped device associated with the computational unit.

According to embodiments illustrated herein, there is provided a computer program product for use with a computer. The computer program product comprises a computer-usable data carrier storing a computer readable program code embodied therein for creating a survey. The computer readable program code comprises program instruction means for defining one or more answer formats corresponding to each of one or more questions. The one or more answer formats correspond to at least one of a gesture, joystick commands, or video. The computer readable program code also comprises program instruction means for defining an answering medium corresponding to each of the one or more answer formats. Answers corresponding to the one or more questions in the defined one or more answer formats are receivable through the associated answering mediums. Furthermore, the computer readable program code comprises program instruction means for creating the survey based on at least one of the one or more questions, the one or more answer formats, and the answering medium corresponding to each of the one or more answer formats.

According to embodiments illustrated herein, there is provided a computer program product for use with a computer. The computer program product comprises a computer-usable data carrier storing a computer readable program code embodied therein for conducting a survey. The computer readable program code comprises program instruction means for enabling presentation of a survey on a computational unit. The survey comprises one or more questions. The computer readable program code also comprises program instruction means for determining one or more answer formats associated with each of the one or more questions. The one or more answer formats correspond to at least one of a gesture, joystick commands, or video. Furthermore, the computer readable program code comprises program instruction means for receiving answers corresponding to the one or more questions through one or more answering mediums associated with the one or more answer formats. The one or more answering mediums comprise at least one of a joystick, a microphone, a camera, or an accelerometer equipped device associated with the computational unit.

BRIEF DESCRIPTION OF DRAWINGS

The accompanying drawings, which are incorporated in the patent application, illustrate various example systems, methods, and other embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples, one element may be designed as multiple elements or that multiple elements may be designed as one element. In some examples, an element shown as an internal component of another element may be implemented as an external component and vice versa. Furthermore, elements may not be drawn to scale.

Various embodiments will hereinafter be described in accordance with the appended drawings provided to illustrate and not to limit the scope in any manner, wherein like designations denote similar elements, and in which.

DETAILED DESCRIPTION

Figure 1:
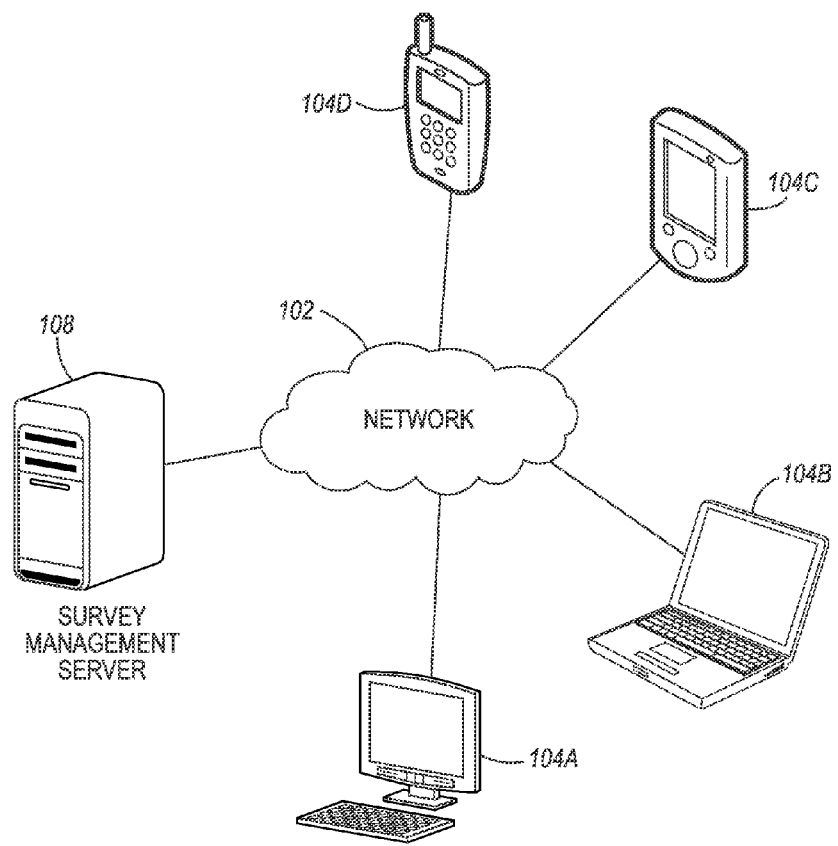
FIG. 1 is a block diagram illustrating an environment in which various embodiments can be implemented.

The present disclosure is best understood with reference to the detailed figures and description set forth herein. Various embodiments are discussed below with reference to the figures. However, those skilled in the art will readily appreciate that the detailed description given herein with respect to the figures is just for explanatory purposes as the method and the system extend beyond the described embodiments. For example, those skilled in the art will appreciate that, in light of the teachings presented, multiple alternate and suitable approaches can be realized, depending on the needs of a particular application, to implement the functionality of any detail described herein, beyond the particular implementation choices in the following embodiments described and shown.

References to "one embodiment", "an embodiment", "one example", "an example", "for example" and so on, indicate that the embodiment(s) or example(s) so described may include a particular feature, structure, characteristic, property, element, or limitation, but not every embodiment or example necessarily includes that particular feature, structure, characteristic, property, element, or limitation. Furthermore, repeated use of the phrase "in an embodiment" does not necessarily refer to the same embodiment, although it may.

Definition of Terms: As used in the present specification and claims, however, unless specified to the contrary, the following terms have the meaning indicated.

An "answer format" refers to a format in which a user's response is received by a survey management system. Answer formats correspond to gestures, joystick commands, audio, or video, text, and mouse clicks. Examples of audio format include, but are not limited to, WAV, AIFF, AU, raw, FLAG, Monkey's Audio (filename extension APE), WavPack (filename extension WV), TTA, ATRAC Advanced Lossless, Apple Lossless (filename extension m4a), MPEG-4 SLS, MPEG-4 ALS, MPEG-4 DST, Windows Media Audio Lossless (WMA Lossless), Shorten (SHN), MP3, Vorbis, Musepack, AAC, ATRAC, and Windows Media Audio Lossy (WMA lossy), and the like. Similarly, examples of video formats include, but are not limited to, Ripped Video Data File (.264), 3GPP Multimedia File (.3gp), Anime Music Video File (.amv), Audio Video Interleave File (.avi), DivX-Encoded Movie File (.divx), Flash Video File (.flv), H.264 Encoded Video File (.h264), MPEG-4 Video File (.mp4), MPEG Movie (.mpeg), Windows Media Video File (.wmv), and the like. In an embodiment, video answer format also includes audio/sound. In an embodiment, gestures include various signs conveyed via human body movement, such as, waving hands, facial expressions, and the like. In an embodiment the human body movement can be captured in the form of a video. In another embodiment, human body movement can be captured in the form of a motion detected by various motion-sensing techniques, like accelerometer. Accelerometers find increasing use in various portable communication devices including smart phones.

An "answering medium" refers to a hardware through which answers corresponding to the questions in the survey are receivable. Examples of the answering medium associated with the computational unit include, but are not limited to, a joystick, a microphone, a camera, an accelerometer equipped device, keyboard, mouse, and so forth.

An "answer type" refers to various options for defining answers associated with various questions. Examples of the answer type include, but are not limited to, "yes" or "no" type, multiple-choice type, rating on a pre-defined scale type, or descriptive type.

A "computational unit" refers to a computer, a device including a processor and/or any other electronic component, device or system that performs one or more operations according to one or more programming instructions. Examples of the computational unit include, but are not limited to, a desktop computer, a laptop, a personal digital assistant (PDA), a smart phone, and the like. The computational unit is capable of accessing a network (e.g., using wired or wireless communication capabilities). Further, the computational unit includes a presentation unit (e.g., capable of presenting text, audio, and/or video to a user). Furthermore, the computational unit includes (or is capable of being interfaced with) various hardware (e.g., answering mediums). In an embodiment, the computational unit is interfaced with the answering mediums through a wired connection. In another embodiment, the computational unit is interfaced with the answering mediums using one or more wireless communication techniques. The examples of the wireless communication techniques include but, are not limited to, Bluetooth, infrared, radio frequency (RF) communication, Wireless LAN, and so forth.

A "network" refers to a medium that interconnects a survey management server and various computational units. Examples of the network include, but are not limited to, LAN, WLAN, MAN, WAN, and the Internet. Communication over the network may be performed in accordance with various communication protocols such as Transmission Control Protocol and Internet Protocol (TCP/IP), User Datagram Protocol (UDP) and IEEE 802.11n communication protocols.

FIG. 1 is a block diagram illustrating an environment 100 in which various embodiments can be implemented. The environment 100 includes a network 102, a desktop computer 104a, a laptop 104b, a PDA 104c, and a smart phone 104d (hereinafter referred to as computational units 104), and a survey management server 108.

The network 102 interconnects the computational units 104 and the survey management server 108. The survey management server 108 facilitates a functionality of managing surveys to the users operating the computational units 104. The users can create the surveys and participate in the surveys using their associated computational units 104. For the simplicity of explanation, four computational units (104a, 104b, 104c, and 104d) are shown; however, the ongoing description is not limited with respect to the number and type of the computational units 104.

Figure 2:
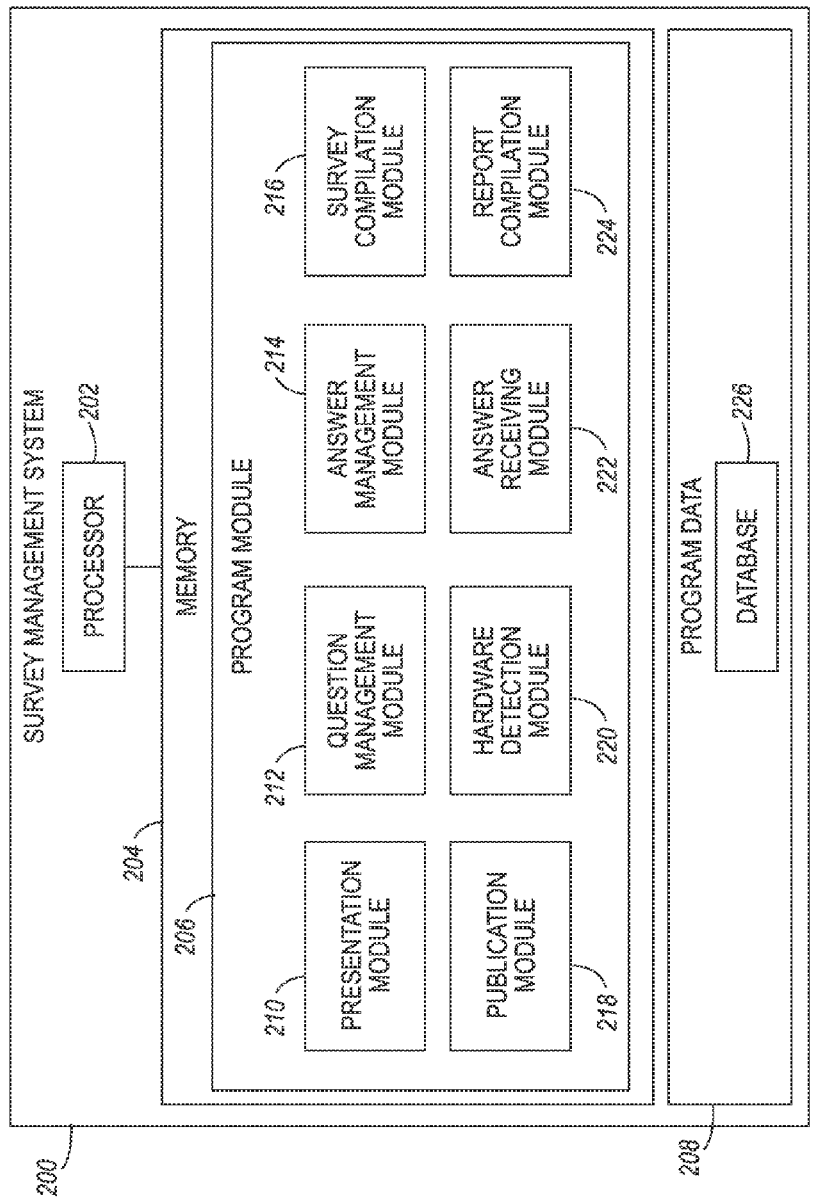
FIG. 2 is a block diagram illustrating a survey management system in accordance with at least one embodiment.

FIG. 2 is a block diagram illustrating a survey management system 200 in accordance with at least one embodiment. The survey management system 200 includes a processor 202 and a memory 204. The memory 204 includes a program module 206 and a program data 208. The program module 206 includes a presentation module 210, a question management module 212, an answer management module 214, a survey compilation module 216, a publication module 218, a hardware detection module 220, an answer receiving module 222, and a report compilation module 224. The program data includes a database 226.

The presentation module 210 presents a graphical user interface (GUI) (e.g., a web-based tool or service) that enables a user to create a survey. In an embodiment, the presentation module 210 displays the GUI on a display unit of the computational units 104. For example, if the user of the desktop computer 104a accesses a website that facilitates functionalities (e.g., a facility of creating a survey) provided by the survey management system 200, the presentation module 210 enables the display of the GUI on an internet browser of the desktop computer 104a. While creating the survey, the presentation module 210 enables the user to interact with the question management module 212 and the answer management module 214.

When any user (i.e., a participant or an attendee) attempts to participate in the survey, the presentation module 210 presents the survey to the user on associated computational units 104. In an embodiment, the user who has created the survey can also participate in the survey. In an embodiment, the presentation module 210 displays the survey on the display associated with the computational units 104. In another embodiment, the presentation module 210 presents the survey as an audio on the computational units 104. In another embodiment, the presentation module 210 presents the survey as a video on the computational units 104. Further, while participating in the survey, the presentation module 210 enables the attendee to interact with the answer receiving module 222.

The question management module 212 is configured to define one or more questions for the survey based on the user's inputs. The question management module 212 enables the user to define questions to be included in the survey by presenting various options for preparing the survey via the presentation module 210. In an embodiment, the presentation module 210 presents the options to the user on the display of his/her associated computational unit (e.g., the computational units 104). In an embodiment, the question management module 212 enables the user to type the questions. In another embodiment, the question management module 212 enables the user to select questions from a predefined list of questions. In another embodiment, the question management module 212 enables the user to upload multimedia content including various questions. For example, in an embodiment, the user can upload a video or an audio file containing (e.g., conveying) the questions. For example, in another embodiment, the user can upload a video or audio file further elaborating the questions defined as text (e.g., typed) or the questions selected from the predefined list of questions. In order to facilitate uploading of the multimedia content, the question management module 212 enables the presentation (through the presentation module 210) of various options for uploading the multimedia content. For example, the user, by clicking on a corresponding option, can upload the video or audio files.

Once questions are received from the user (e.g., when the user indicates that he/she has finished defining questions by clicking on an appropriate option, such as, "done"), the question management module 212 stores the questions and any uploaded multimedia file in the database 226.

The answer management module 214 defines one or more answer formats corresponding to each of one or more questions based on the user's inputs. The answer management module 214 enables the user to define formats in which the user's response (e.g., response from the user who is creating the survey) should be received. The user can define the answer formats corresponding to at least one of a gesture, joystick commands, audio, or video for each question. Thereafter, the answer management module 214 defines an answering medium (e.g., a hardware) corresponding to each of the answer formats. Examples of the answering mediums include, but are not limited to, joystick, microphone, camera, and accelerometer equipped device. The answers corresponding to the one or more questions in the defined one or more answer formats are receivable through the associated answering mediums. In order to define the answering mediums, the answer management module 214 refers to a table containing mappings of the various answer formats and associated answering mediums. The table is stored in the database 226 and is maintained by the answer management module 214. For example, if the user defines any answer format corresponding to a video (e.g., the .wmv format), the answer management module 214 defines the microphone and the camera as a corresponding answering medium. Similarly, the answering mediums for other answer formats can also be defined by the answer management module 214.

Further, the answer management module 214 enables the user to define an answer type for receiving the answer associated with each question. The answer management module 214 presents various options for selecting the answer type, such as, "yes" or "no" type, multiple-choice type, rating on a pre-defined scale type, or descriptive type, to the user.

Once the user's responses for defining the answer formats and the answer types are received, the answer management module 214 stores the answer formats, the details on the corresponding answering mediums, and the answer types for each question in the database 226.

The survey compilation module 216 retrieves the data (e.g., one or more of the questions, the multimedia content, the answer formats, the details on the corresponding answering mediums, and the answer types for each question) from the database 226. The survey compilation module 216 then creates the survey based on the retrieved data. Once the survey is created, the survey compilation module 216 stores the survey in the database 226.

The publication module 218 presents (through the presentation module 210) various options for specifying details on where the user wants to publish the survey. For example, the options include various fields for specifying a website address, an email address, and the like. The publication module 218 retrieves the survey from the database 226. Then, based on the data inputted by the user (e.g., the website address and/or the email address), the publication module 218 publishes the survey.

In brief, the presentation module 210 serves as a front-end for the remaining modules as it enables the user's interaction with the remaining modules. The question management module 212 is configured to define the questions to be included in the survey and stores the details on the questions in the database 226. The answer management module 214 is configured to define the answer formats, the answering mediums, and answer types for each question. The answer management module 214 then stores the details on the defined answer formats, the answering mediums, and answer types for each question in the database 226. The survey compilation module 216 retrieves the data (e.g., the data stored by the question management module 212 and the answer management module 214) from the database 226 and creates the survey. The survey compilation module 216 then stores the compiled survey in the database 226. The publication module 218 retrieves the survey from the database 226 and publishes the survey on the websites and/or email addresses specified by the user. The survey is then available to other users (e.g., the users who can access the specified websites and/or the email addresses).

The hardware detection module 220 detects the answering mediums associated with the computational unit (like, the computational units 104) when the participant (i.e., attendee) attempts to attend the survey. For example, if the user of the laptop 104b attempts to attend the survey, the hardware detection module 220 detects the hardware (e.g., the answering mediums), like, the microphone, the camera, the joystick, the accelerometer equipped device, the keyboard, the mouse, and the like, through which the user's responses to the questions in the survey can be received.

The answer receiving module 222 determines the answer formats associated with each question. The answer receiving module 222 then activates the associated answering medium (if detected by the hardware detection module 220) corresponding to each question at the time the question is presented to the user. Henceforth, the answer can be received through the activated answering medium. The answer receiving module 222 then receives the user's response (i.e., answer) for the question through the associated answering medium.

The answer receiving module 222 then stores the user's responses for various questions in the database 226. In an embodiment, the answer receiving module 222 stores the answers as text in the database 226. In another embodiment, the answer receiving module 222 stores the video containing the user's responses in the database 226. In another embodiment, the answer receiving module 222 stores the audio containing the user's responses in the database 226. In yet another embodiment, the answer receiving module 222 stores commands (or information on signals) received from the joystick and/or the accelerometer equipped device in the database 226.

The report compilation module 224 analyzes the data stored by the answer receiving module 222 in the database 226. For example, the text and commands received from the joystick and/or the accelerometer equipped device, the audio, and the video are analyzed by the report compilation module 224. In an embodiment, the report compilation module 224 implements various computer vision techniques to analyze the video containing the user's responses. In another embodiment, a human operator manually analyzes the video and provides his responses to the survey management system 200 via a user interface activated by the presentation module 210. In an embodiment, the human operator is the user who has created the survey. These responses are then communicated to the report compilation module 224. In an embodiment, the report compilation module 224 implements various speech recognition techniques, such as the techniques implemented by iListen®, Naturally Speaking®, or ViaVoice™, to analyze the audio containing the user's responses. In an embodiment, the report compilation module 224 also analyzes the gestures received in the form of a video and signals received through the accelerometer equipped devices.

Based on the analysis of the data, the report compilation module 224 generates a survey report. In an embodiment, the report compilation module 224 stores the survey report in the database 226. The survey report contains the attendee's responses on the questions in the survey. In an embodiment, the survey report contains information collated from the responses by multiple attendees. In an embodiment, the report compilation module 224 periodically (i.e., at an interval set by the user who has created the survey) generates the survey report. In an embodiment, the report compilation module 224 sends an email containing the survey report to the user who created the survey.

The database 226 is a storage device that stores the data submitted from and/or required by the question management module 212, the answer management module 214, the survey compilation module 216, the publication module 218, the hardware detection module 220, the answer receiving module 222, and the report compilation module 224. In an embodiment, the database 226 can be implemented using technologies including, but not limited to, Oracle®, IBM DB2®, Microsoft SQL Server®, Microsoft Access®, PostgreSQL®, MySQL® and SQLite®, and the like.

Figure 3:
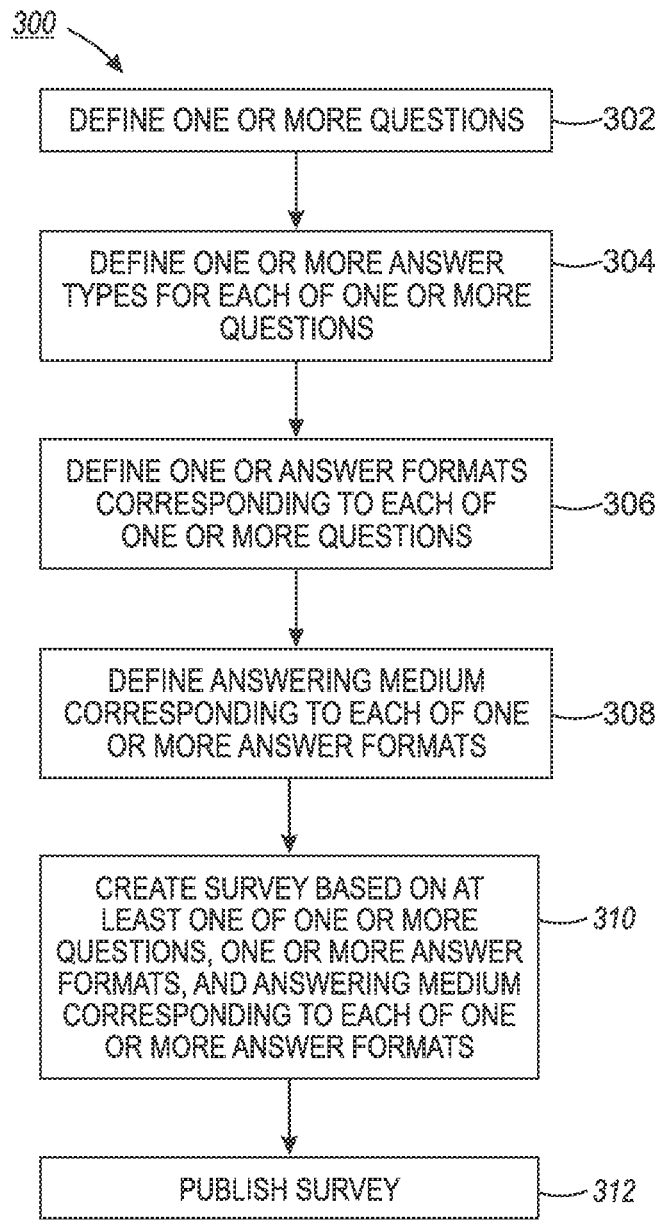
FIG. 3 is a flow diagram illustrating a method of creating a survey in accordance with at least one embodiment.

FIG. 3 is a flow diagram 300 illustrating a method of creating the survey in accordance with at least one embodiment.

At step 302, the one or more questions are defined. In an embodiment, the one or more questions are defined by the question management module 212 based on the user inputs. In an embodiment, defining the questions includes receiving the multimedia content containing the questions. This is further explained in the description supra.

At step 304, the one or more answer types are defined. In an embodiment, the one or more answer types are defined by the answer management module 214 based on the user inputs.

At step 306, the one or more answer formats corresponding to each of the one or more questions are defined. In an embodiment, the one or more answer formats are defined by the answer management module 214 based on the user inputs. This is explained in detail in conjunction with FIG. 2.

At step 308, the answering medium corresponding to each of the one or more answer formats is defined. In an embodiment, the answering medium is defined by the answer management module 214.

At step 310, the survey is created based on at least one of the one or more questions, the one or more answer formats, and the answering medium corresponding to each of the one or more answer formats. In an embodiment, the survey is created by the survey compilation module 216.

At step 312, the survey is published. In an embodiment, the survey can be published on the one or more websites specified by the user. In another embodiment, the survey can be emailed to the one or more email addresses specified by the user. In an embodiment, the survey is published by the publication module 218.

Figure 4:
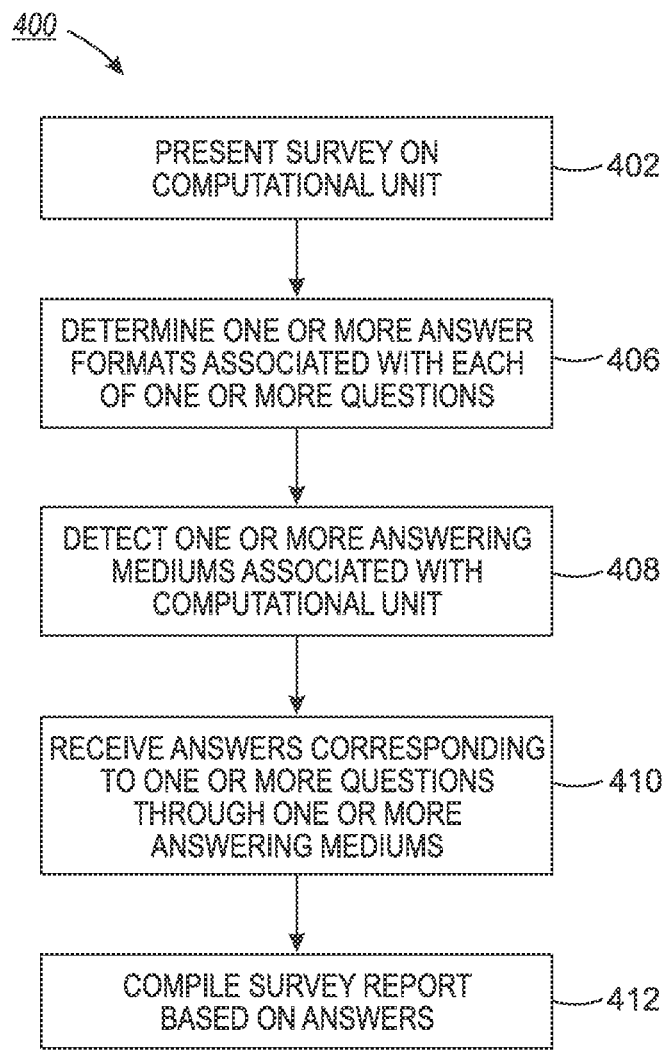
FIG. 4 is a flow diagram illustrating a method of conducting a survey in accordance with at least one embodiment.

FIG. 4 is a flow diagram 400 illustrating a method of conducting the survey in accordance with at least one embodiment.

In an embodiment, the attendee of the survey attempts to access the survey from the laptop 104b. This consideration is for example and the survey can be accessed from any of the computational units 104.

At step 402, the survey is presented on the computational unit (i.e., on the laptop 104b). When the attendee attempts to access the survey, the survey is presented to the attendee. As disclosed earlier, in an embodiment, the presentation of the survey is enabled by the presentation module 210, the details of which are discussed in the description of FIG. 2.

At step 406, the one or more answer formats associated with each of the one or more questions are determined. In an embodiment, the answer formats are determined by the answer receiving module 222.

At step 408, the one or more answering mediums (e.g., hardware) associated with the computational unit are detected. In an embodiment, the answering mediums are detected by the hardware detection module 220. Once detected, the answering medium for the specified answer format associated with a question is activated by the answer receiving module 222 when the question is presented to the user.

At step 410, the answers corresponding to the one or more questions are received through the answering mediums. In an embodiment, the answers are received by the answer receiving module 222 in the defined formats. The details of the received answers are then stored in the database 226 by the answer receiving module 222. This is further discussed in conjunction with FIG. 2.

At step 412, the survey report is generated based on the answers. In an embodiment, the survey report is generated by the report compilation module 224.

The disclosed methods and systems, as described in the ongoing description or any of its components, may be embodied in the form of a computer system. Typical examples of a computer system include a general-purpose computer, a programmed microprocessor, a micro-controller, a peripheral integrated circuit element, and other devices or arrangements of devices that are capable of implementing the steps that constitute the method of the disclosure.

The computer system comprises a computer, an input device, a display unit and the Internet. The computer further comprises a microprocessor. The microprocessor is connected to a communication bus. The computer also includes a memory. The memory may be Random Access Memory (RAM) or Read Only Memory (ROM). The computer system further comprises a storage device, which may be a hard-disk drive or a removable storage drive, such as a floppy-disk drive, optical-disk drive, etc. The storage device may also be other similar means for loading computer programs or other instructions into the computer system. The computer system also includes a communication unit. The communication unit allows the computer to connect to other databases and the Internet through an Input/Output (I/O) interface, allowing the transfer as well as reception of data from other databases. The communication unit may include a modem, an Ethernet card, or other similar devices, which enable the computer system to connect to databases and networks such as LAN, MAN, WAN, and the Internet. The computer system facilitates inputs from a user through an input device, accessible to the system through an I/O interface.

The computer system executes a set of instructions that are stored in one or more storage elements, in order to process input data. The storage elements may also hold data or other information as desired. The storage element may be in the form of an information source or a physical memory element present in the processing machine.

The programmable or computer-readable instructions may include various commands that instruct the processing machine to perform specific tasks, such as the steps that constitute the method of the disclosure. The method and systems described can also be implemented using only software programming or hardware or by a varying combination of the two techniques. The disclosure is independent of the programming language and the operating system used in the computers. The instructions for the disclosure can be written in all programming languages including, but not limited to 'C', 'C++', 'Visual C++', and 'Visual Basic'. Further, the software may be in the form of a collection of separate programs, a program module with a larger program or a portion of a program module, as given in the disclosure. The software may also include modular programming in the form of object-oriented programming. The processing of input data by the processing machine may be in response to user commands, results of previous processing or a request made by another processing machine. The disclosure can also be implemented in various operating systems and platforms including, but not limited to, 'Unix', 'DOS', 'Android', 'Symbian', and 'Linux'.

The programmable instructions can be stored and transmitted on a computer-readable medium. The disclosure can also be embodied in a computer program product comprising a computer-readable medium, with the product capable of implementing the above methods and systems, or the numerous possible variations thereof.

The method, system, and computer program product, as described above, have numerous advantages. Some of these advantages may include, but are not limited to, creating interactive surveys. The disclosed method and system also enables the attendee to provide responses in the form of audio, video, and/or gestures in addition to conventional text and mouse clicks. Such interactive techniques help retain the attention of the attendees to ensure quality of responses. Further, presenting the questions in the form of video or audio helps to better convey the questions. Multimedia questions (e.g., questions conveyed through the uploaded multimedia content) provide a deeper level of communication than mere written text. Products and concepts can be visually demonstrated, 3D views can be provided, and other customer testimonials can be shown. Further, by presenting such interactive surveys, an improved response rate can be achieved. Also, shorter survey times can be expected as a result of these more engaging surveys. Allowing customers (e.g., the attendees) to speak encourages them to provide further feedback. Visually and physically challenged respondents can also further participate in such voice and video-activated surveys.

Various embodiments of the method and system for managing surveys have been disclosed. It should be apparent, however, to those skilled in the art that many more modifications besides those already described are possible without departing from the inventive concepts herein. The embodiments, therefore, are not to be restricted except in the spirit of the disclosure. Moreover, in interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

It will be appreciated by a person skilled in the art that the system, modules, and sub-modules have been illustrated and explained to serve as examples and should not be considered limiting in any manner. It will be appreciated that the variants of the above disclosed system elements, or modules and other features and functions, or alternatives thereof, may be combined to create many other different systems or applications.

Those skilled in the art will appreciate that any of the foregoing steps and/or system modules may be suitably replaced, reordered, or removed, and additional steps and/or system modules may be inserted, depending on the needs of a particular application, and that the systems of the foregoing embodiments may be implemented using a wide variety of suitable processes and system modules and are not limited to any particular computer hardware, software, middleware, firmware, microcode, etc.

The claims can encompass embodiments for hardware, software, or a combination thereof.

It will be appreciated that variants of the above disclosed and other features and functions, or alternatives thereof, may be combined into many other different systems or applications. Various presently unforeseen or unanticipated alternatives, modifications, variations, or improvements therein may

What is claimed is:

1. A method for creating a survey, the method comprising:
receiving, by a survey management system, one or more questions defined at one or more computational units from among a plurality of computational units, wherein the survey management system and the plurality of computational units are interconnected by a network, and the one or more questions are transmitted over the network;
defining one or more answer formats in which a response to each of the one or more questions will be received by the survey management system for each of the one or more questions, wherein the one or more answer formats correspond to a gesture, a joystick command, or a video;
defining one or more answering mediums corresponding to each of the one or more answer formats, wherein each of the one or more answering mediums corresponds to a joystick, a microphone, a camera, an accelerometer equipped device, keyboard, or a mouse through which an answer corresponding to each of the one or more questions is receivable in the defined answer format;
defining an answer type for receiving the answer associated with each of the one or more questions;
creating the survey by the survey management system based on the one or more answer formats, the corresponding answering mediums, and the defined answer type for each of the one or more questions;
publishing the survey to selected computational units from among the plurality of computational units, by the survey management system over the network; and
detecting, by the survey management system, one or more answering mediums associated with each of the selected computational units; and
activating at least one of the one or more detected answering mediums when receiving answers to each of the one or more questions from each of the selected computational units.

2. The method of claim 1, wherein receiving the one or more questions further comprises receiving multimedia content.

3. The method of claim 1, wherein the one or more answer formats further comprise an audio file, a text, or a mouse click.

4. The method according to claim 1, wherein the answer type comprises at least one of "yes" or "no" type, multiple choice type, rating on a pre-defined scale, or a descriptive type.

5. The method of claim 1, wherein publishing the survey to the selected computational units from among the plurality of computational units further comprises uploading the survey on a website.

6. The method of claim 1, wherein publishing the survey to the selected computational units from among the plurality of computational units further comprises communicating the survey to one or more e-mail addresses.

7. The method of claim 1, further comprising presenting the survey on the selected computational units from among the plurality of computational units.

8. A method comprising:
presenting a survey on a computational unit, wherein the survey comprises one or more questions, and wherein the survey is communicated to the computational unit by a survey management system over a network;
determining one or more answer formats in which a response to each of the one or more questions will be received by the survey management system for each of the one or more questions, wherein the one or more answer formats correspond to a gesture, a joystick command, or a video;
detecting, by the survey management system, one or more answering mediums associated with the computational unit;
activating at least one or more answering mediums from among the one or more detected answering mediums corresponding to a joystick, a microphone, a camera, an accelerometer equipped device, keyboard, or a mouse through which an answer corresponding to each of the one or more questions is receivable in the defined answer format and corresponding to the one or more answer formats for each question of the one or more questions, when the question is presented on the computational unit;
receiving the answer corresponding to each of the one or more questions through the at least one or more activated answering mediums; and
compiling a survey report based on the answer, wherein the survey is created based on the one or more questions, the one or more answer formats associated with each of the one or more questions, and the corresponding one or more answering mediums.

9. A method for creating a survey, the method comprising:
defining one or more questions at a first computational unit, and transmitting the one or more questions to a survey management system over a network;
defining one or more answer formats at the computational unit in which a response to each of the one or more questions will be received corresponding to each of the one or more questions, and transmitting the one or more answer formats for each of the one or more questions to the survey management system over the network, wherein the one or more answer formats corresponds to at least one of a gesture, a joystick command, or a video;
defining one or more answering mediums corresponding to the one or more answer formats, wherein the one or more answering mediums further correspond to a joystick, a microphone, a camera, an accelerometer equipped device, keyboard, or a mouse through which an answer corresponding to each of the one or more questions is receivable in the defined one or more answer formats, and wherein the one or more answering mediums corresponding to the defined one or more answer formats for a question of the one or more questions is activated when the question is presented on a computational unit; and
creating the survey by the survey management system based on the one or more questions, the one or more answer formats, and the one or more answering mediums;
associating a second computational unit with the one or more answering mediums;
detecting the one or more answering mediums associated with the second computational unit attempting to attend the created survey over the network; and
activating the detected one or more answering mediums to receive answers to each of the one or more questions from the second computational unit.

* * * * *